(12) United States Patent
Pandit et al.

(10) Patent No.: US 9,154,808 B2
(45) Date of Patent: Oct. 6, 2015

(54) METHOD AND APPARATUS FOR INTRA PREDICTION FOR RRU

(75) Inventors: Purvin Bibhas Pandit, Franklin Park, NJ (US); Peng Yin, Plainsboro, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2576 days.

(21) Appl. No.: 11/795,346

(22) PCT Filed: Jan. 5, 2006

(86) PCT No.: PCT/US2006/000250
§ 371 (c)(1),
(2), (4) Date: Jul. 13, 2007

(87) PCT Pub. No.: WO2006/078454
PCT Pub. Date: Jul. 27, 2006

(65) Prior Publication Data
US 2008/0130745 A1 Jun. 5, 2008

Related U.S. Application Data

(60) Provisional application No. 60/643,978, filed on Jan. 14, 2005.

(51) Int. Cl.
*H04N 7/12* (2006.01)
*H04N 19/59* (2014.01)
(Continued)

(52) U.S. Cl.
CPC ............ *H04N 19/59* (2014.11); *H04N 19/159* (2014.11); *H04N 19/176* (2014.11); *H04N 19/593* (2014.11); *H04N 19/61* (2014.11); *H04N 19/82* (2014.11)

(58) Field of Classification Search
CPC ....... H04N 19/59; H04N 19/61; H04N 19/82; H04N 19/593; H04N 19/159; H04N 19/176
USPC ........................................ 375/240.01, 240.12
See application file for complete search history.

(56) References Cited

U.S. PATENT DOCUMENTS 6,078,617 A * 6/2000 Nakagawa et al. ............ 375/240
7,379,496 B2 * 5/2008 Holcomb et al. ........ 375/240.03
(Continued)

OTHER PUBLICATIONS
Rakesh Dugad et al., A Fast Scheme for Image Size Change in the Compressed Domain, Apr. 2001, IEEE, vol. 11, No. 4, pp. 461-474.*
(Continued)

*Primary Examiner* — Bradley Holder
*Assistant Examiner* — Fahimeh Mohammadi
(74) *Attorney, Agent, or Firm* — Robert D. Shedd; Julia Tanase

(57) ABSTRACT

There are provided encoders, decoders and corresponding encoding and decoding methods. A reduced resolution update based video encoder for encoding video data divisible into macroblocks includes a memory device, a downsampler, INTRA coding means, an encoder, a decoder, and an upsampler. The memory device is for storing reduced resolution neighboring pixels. The downsampler is for downsampling a full resolution macroblock to obtain a reduced resolution macroblock. The INTRA coding means is for performing INTRA prediction for the reduced resolution macroblock using the stored reduced resolution neighboring pixels. The encoder is for encoding residual data for the reduced resolution macroblock. The decoder is for decoding the residual data for the reduced resolution macroblock to form a reconstructed low resolution INTRA coded macroblock. The upsampler is for upsampling the reconstructed low resolution INTRA coded macroblock to form a full resolution INTRA coded macroblock. The memory device is further for storing a right column and a bottom row of the reconstructed low resolution INTRA coded macroblock.

12 Claims, 5 Drawing Sheets

(51) Int. Cl.
*H04N 19/159* (2014.01)
*H04N 19/176* (2014.01)
*H04N 19/61* (2014.01)
*H04N 19/593* (2014.01)
*H04N 19/82* (2014.01)

(56) References Cited

U.S. PATENT DOCUMENTS

| | | | |
|---|---|---|---|
| 2005/0175099 A1* | 8/2005 | Sarkijarvi et al. | 375/240.16 |
| 2006/0109913 A1* | 5/2006 | Wang et al. | 375/240.24 |
| 2006/0133472 A1* | 6/2006 | Bruls et al. | 375/240.1 |
| 2009/0010333 A1 | 1/2009 | Tourapis et al. | |
| 2009/0190657 A1* | 7/2009 | Park et al. | 375/240.03 |

OTHER PUBLICATIONS

Guobin Shen et al.,Transcoder With Arbitrarily Resizing Capability, 2001, IEEE, vol. 5, pp. 25-28.*

Rakesh Dugad et al., A Scheme for Spatial Scalability Using Nonscalable Encoders, Oct. 2003, IEEE, vol. 13, No. 10, pp. 993-999.*

Rakesh Dugad et al., A Fast Scheme for Downsampling and Upsampling in the DCT Domain, Oct. 24-28, 1999, IEEE, vol. 2, pp. 909-913.*

P. Yin et al.: "A New Intra Prediction Method for RRU", ITU-T Video Coding Experts Group 14th Meeting: Hong Kong, Document VCEG-Y17, Jan. 12, 2005, pp. 1-4.

Internet Document: "Index of/av-arch/video-site/0501_Hon", Online XP002375194.

A.M. Tourapis et al: "Reduced Resolution Update Mode for Advanced Video Coding" ITU-T Video Coding Experts Group (ITU-T SG16 Q.6), 15 Mar. 15, 2004, pp. 1-9.

A.M. Tourapis et al.: "New Results on Reduced Resolution Update Mode" ITU-T Video Coding Experts Group (ITU-T SG16 Q.6), Jul. 19, 2004, pp. 1-12.

"Recommendation H.263: Video coding for low bit rate communication" ITU-T Draft Recommendation H.263, Feb. 1998, pp. 1-167.

Search Report Dated Mar. 31, 2006.

ITU-T H.264 "Advanced video coding for generic audiovisual servies", Mar. 2004.

Yin et al: "Complexity Scalable Video Codec", ITU-T Q6/SG16, document VCEG-X06, Palma de Mallorca, Spain, Oct. 18-22, 2004.

Sievers et al: "Reduced Resolution Update for Computational Efficiency", ITU-T, Q6/SG16, document 7, Geneva Nov. 16-26, 2004.

* cited by examiner

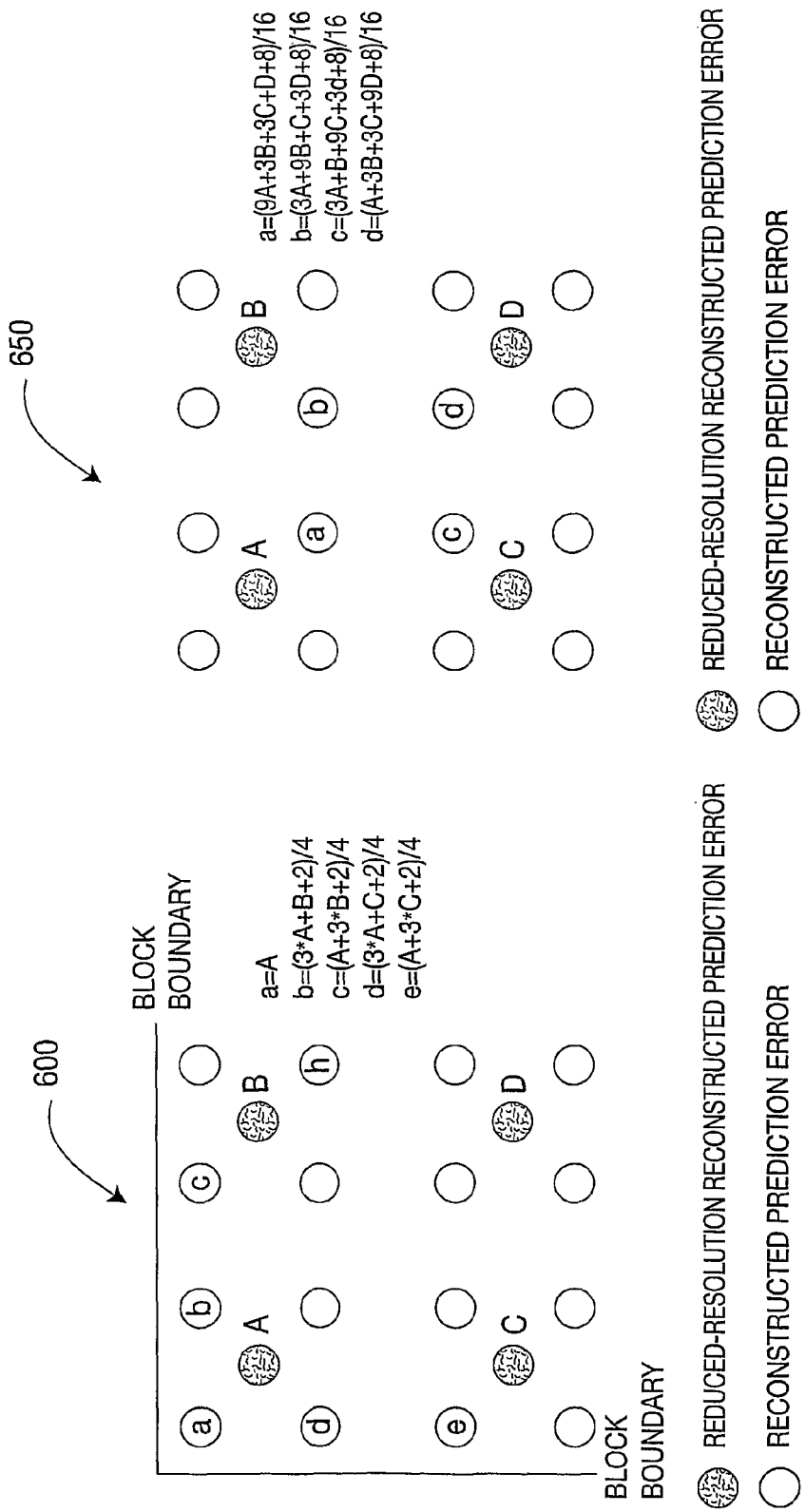

METHOD AND APPARATUS FOR INTRA PREDICTION FOR RRU

CROSS-REFERENCE TO RELATED APPLICATIONS

This application claims the benefit, under 35 U.S.C. §365 of International Application PCT/US2006/000250, filed Jan. 5, 2006, which was published in accordance with PCT Article 21(2) on Jul. 27, 2006 in English and which claims the benefit of U.S. provisional patent application No. 60/643,978, filed Jan. 14, 2005.

FIELD OF THE INVENTION

The present invention generally relates to video encoders and decoders and, more particularly, to a method and apparatus for performing INTRA prediction for Reduced Resolution Update (RRU) mode.

BACKGROUND OF THE INVENTION

Several different methods for intra prediction for Reduced Resolution Update (RRU) based video encoders and decoders (CODECS) have been proposed. In a first prior art method for intra prediction for RRU based CODECs, the spatial intra prediction methods in H.264 using either 4×4 or 16×16 block size are extended to 8×8 and 32×32 block sizes for RRU mode. The residue is downsampled and is coded using the same transform and quantization process in H.264. During decoding, the residual data needs to be upsampled. The downsampling process is done only in the encoder, and hence does not need to be standardized. However, the upsampling process must be matched in the encoder and decoder, and so must be standardized.

In a second prior art method for RRU based video CODECS, an intra prediction method is proposed to improve the subjective quality of the video. First, the original full resolution samples are downsampled, and then a low resolution prediction is created based on these new samples. This low resolution prediction is upsampled to full resolution (i.e., using zero order hold) and used for prediction. It is also proposed in this method/apparatus to consider odd samples for odd positions, and even samples for even positions. This method improves the subjective quality but still has many artifacts on edges.

In a third prior art method for intra prediction in RRU based CODECS, it is proposed to generate prediction blocks for Intra coding. Rather than work on the full resolution image, the pixels neighboring the 32×32 coding region are downsampled and placed in a temporary buffer. Next, the intra prediction is done the same as is done in the JVT standard implementation, with prediction decisions made on each 4×4 block. After the prediction and residual coding is complete, the intra macroblock is upsampled to replace the macroblock in the reference image. The shortcoming of this approach is that all high-frequency prediction information is lost during the downsampling process. This method also does not work in conjunction with an RRU based complexity scalable video CODEC. Since this approach requires downsampling of the reference pixels for intra prediction, the upsampling filter as well as the downsampling filter must be standardized.

In the third prior art method, the encoder downsamples the neighboring pixels of the 32×32 macroblock to perform the intra prediction on a 16×16 macroblock and after the prediction and residual coding is complete, the intra macroblock is upsampled to replace the macroblock in the reference image. When the pixels of this intra macroblock are used for intra prediction of its neighboring macroblock the same procedure of downsampling and upsampling is carried out. Since the upsampling and downsampling are non-reversible processes this results in a loss of details. This method also does not work for the RRU based complexity scalable video CODECs. Particularly, for the low resolution decoding, this downsampling and upsampling of the neighboring pixels results in a mismatch at the decoder, the visual impact of which is extremely severe.

Therefore, current intra prediction methods for RRU video CODECS do not perform well on block edges. They result in very prominent jagged edges. This has a severe impact on the visual quality of the video sequence.

Accordingly, it would be desirable and highly advantageous to have a method and apparatus for performing intra prediction for Reduced Resolution Update (RRU) mode that overcomes the above-described problems of the prior art.

SUMMARY OF THE INVENTION

These and other drawbacks and disadvantages of the prior art are addressed by the present invention, which is directed to a method and apparatus for performing INTRA prediction for Reduced Resolution Update (RRU) mode.

According to an aspect of the present invention, there is provided a reduced resolution update (RRU) based video encoder for encoding video data divisible into macroblocks. The RRU based video encoder includes a memory device, a downsampler, INTRA coding means, an encoder, a decoder, and an upsampler. The memory device is for storing reduced resolution neighboring pixels. The downsampler is for downsampling a full resolution macroblock to obtain a reduced resolution macroblock. The INTRA coding means is for performing INTRA prediction for the reduced resolution macroblock using the stored reduced resolution neighboring pixels. The encoder is for encoding residual data for the reduced resolution macroblock. The decoder is for decoding the residual data for the reduced resolution macroblock to form a reconstructed low resolution INTRA coded macroblock. The upsampler is for upsampling the reconstructed low resolution INTRA coded macroblock to form a full resolution INTRA coded macroblock. The memory device is further for storing a right column and a bottom row of the reconstructed low resolution INTRA coded macroblock.

According to another aspect of the present invention, there is provided a reduced resolution update (RRU) based video decoder for decoding video data divisible into macroblocks. The RRU based video decoder includes INTRA prediction means, a decoder, a memory device, and an upsampler. The INTRA prediction means is for performing INTRA prediction for a current macroblock using stored low resolution neighboring pixels. The decoder is for decoding residual data for the current macroblock to reconstruct the current macroblock. The memory device is for storing a right column and a bottom row of the reconstructed current macroblock. The upsampler is for upsampling the reconstructed current macroblock to form a full resolution current macroblock.

According to yet another aspect of the present invention, there is provided a reduced resolution update (RRU) based video CODEC. The RRU based video CODEC includes at least two upsampling filters, wherein different ones of the at least two upsampling filters are used to upsample INTRA coded macroblocks than to upsample INTER coded macroblocks.

According to a still further aspect of the present invention, there is provided a scalable video CODEC. The scalable video CODEC includes a reduced resolution update (RRU) based scalable CODEC for performing INTRA prediction using stored low resolution neighboring pixels.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIGS. 6A and 6B show diagrams for residual upsampling processes for block boundaries and inner positions, respectively, in accordance with the principles of the present invention.

DETAILED DESCRIPTION

Figure 1:
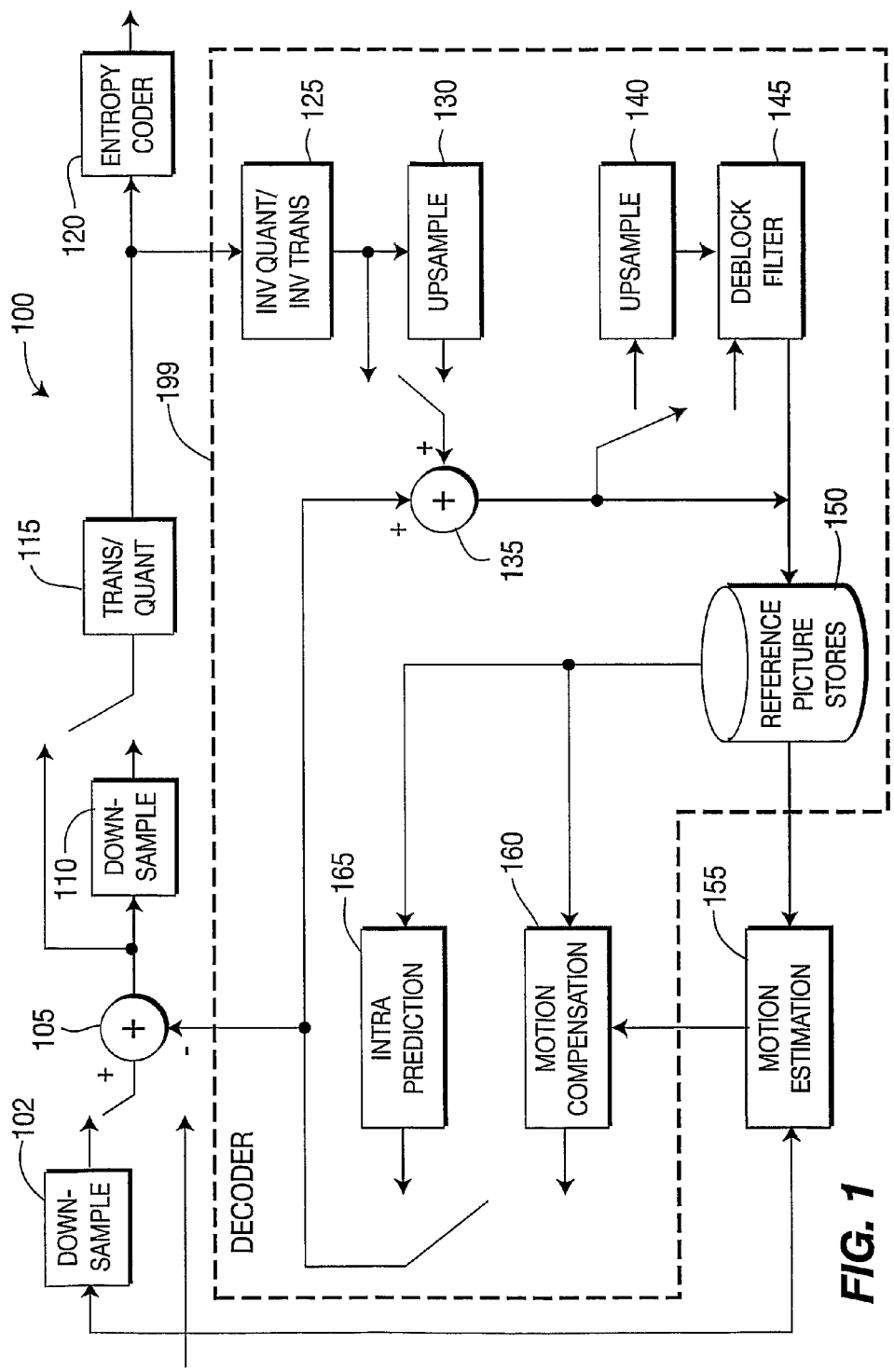
FIG. 1 shows a block diagram for a video encoder in accordance with the principles of the present invention.

The present invention is directed to a method and apparatus for performing intra prediction for Reduced Resolution Update (RRU) mode. In accordance with the principles of the present invention, intra prediction is based on a reduced resolution picture, using stored reduced resolution neighboring pixels. After the whole macroblock has been reconstructed at a reduced resolution, it is upsampled to be placed in the full resolution picture buffer. Among other deficiencies corrected by the present invention, the present invention advantageously overcomes the problem of jagged block edges and can be used for complexity scalable video CODECs.

It is to be appreciated that while the present invention is primarily described herein with respect to video CODECs in accordance with the H.264/Joint Video Team (JVT)/MPEG4-Advanced Video Coding (AVC) standard, given the teachings of the present invention provided herein, one of ordinary skill in this and related arts may readily implement the present invention with respect to other video compression standards, while maintaining the scope of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Advantageously, the present invention provides a method and apparatus for performing intra prediction for Reduced Resolution Update (RRU) mode. Thus, the present invention is an adaptation and extension beyond the third prior art method for intra prediction for RRU CODECs described above, and advantageously addresses the deficiencies associated therewith.

In accordance with the principles of the present invention, adaptations, modifications, and extensions are made to the third prior art method described above in the following manner. Similarly to the above-described methodology, the present invention also performs intra prediction on a 16×16 macroblock basis. However, instead of using the first upsampled and then downsampled neighboring pixels for intra prediction, the various embodiments of the present invention store the low resolution version of the neighbor before it is upsampled. A detailed explanation follows.

The restriction that is imposed in accordance with the principles of the present invention is that constrained_ intra_prediction_flag is set to 1, which means that only pixels of intra neighbors can be used for the intra prediction of a current macroblock. For each coded intra macroblock, we store its right column (16 pixels for luma, 8 pixels for Cr and 8 pixels for Cb) and bottom row (16 pixels for luma, 8 pixels for Cr and 8 pixels for Cb) before we upsample it. Thus, an additional 64 bytes per intra macroblock are used. For intra prediction, the current macroblock accesses these stored low resolution pixels of the neighboring macroblock.

Turning to FIG. 1, a video encoder for encoding video data is indicated generally by the reference numeral 100.

A non-inverting input of an adder 105 (e.g.—a summing junction or other means for combining inputs) is connected in signal communication with an output of a downsampler 102 or with an input to the video encoder 100. An output of the adder 105 is connected in signal communication with an input of a downsampler 110. An input of a transformer/quantizer 115 is connected in signal communication with the output of the adder 105 or with an output of the downsampler 110. An output of the transformer/quantizer 115 is connected in signal communication with an input of an entropy coder 120 and with an input of an inverse quantizer/inverse transformer 125.

An output of the inverse quantizer 125 is connected in signal communication with an input of an upsampler 130. A first non-inverting input of an adder 135 is connected in signal communication with the output of the inverse quantizer/inverse transformer 125 or with an output of the upsampler 130. An output of the adder 135 (e.g.—a summing junction or other means for combining inputs) is connected in signal communication with an input of an upsampler 140 or with a first input of a deblock filter 145 or with an input of a reference picture stores 150. An output of the upsampler 130 is connected in signal communication with a second input of the deblock filter 145. An output of the deblock filter 145 is connected in signal communication with the input of the reference picture stores 150. A first output of the reference picture stores 150 is connected in signal communication with a first input of a motion estimator 155. An output of the motion estimator 155 is connected in signal communication with a first input of a motion compensator 160. A second output of the reference picture stores 150 is connected in signal communication with a second input of the motion compensator 160 and with an input of an intra predictor 165.

An inverting input of the adder 105 and a non-inverting input of the adder 135 are connected in signal communication with an output of the motion compensator 160 or with an output of the intra predictor 165. The input to the video encoder 100 is also connected in signal communication with an input of the downsampler 102 and with a second input of the motion estimator 155. An output of the entropy coder 120 is available as an output of the video encoder 100.

It is to be appreciated that encoder 100 includes a decoder 199. The decoder 199 is formed from the intra predictor 165, the motion compensator 160, the motion estimator 155, the inverse quantizer/inverse transformer 125, the upsampler 130, the upsampler 140, the deblock filter 145, and the reference picture stores 150.

Figures 2, 3:
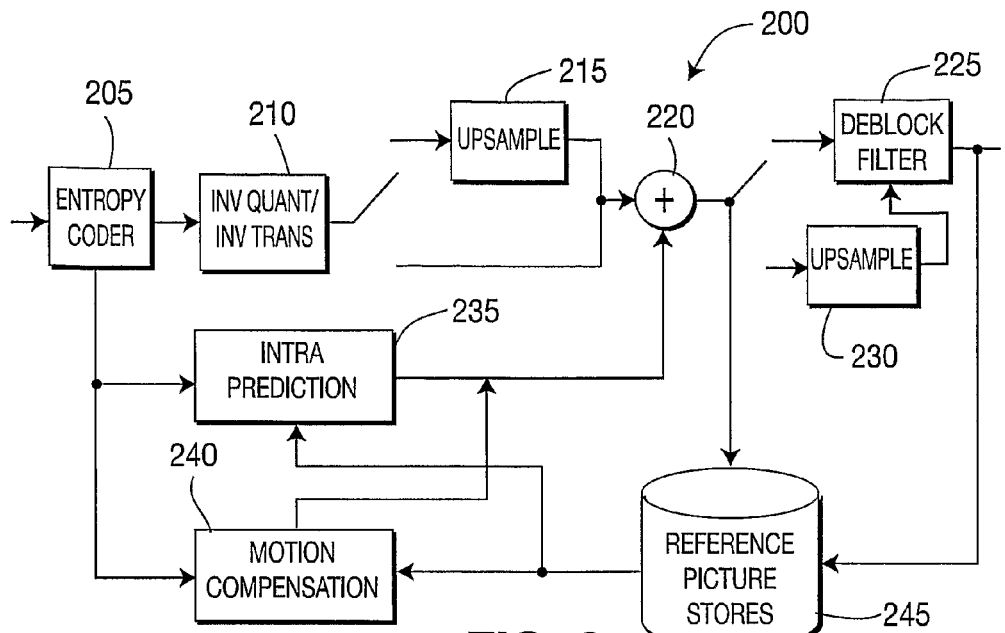
FIG. 2 shows a block diagram for a video decoder in accordance with the principles of the present invention.
FIG. 3 shows a table illustrating low resolution samples of neighboring macroblocks used for intra prediction of a current macroblock in accordance with the principles of the present invention.

Turning to FIG. 2, a video decoder for decoding video data is indicated generally by the reference numeral 200. An input to the video decoder 200 is connected in signal communication with an input of an entropy decoder 205. A first output of the entropy decoder 205 is connected in signal communication with an input of an inverse quantizer/inverse transformer 210. An output of an inverse quantizer/inverse transformer 210 is connected in signal communication with an input of an upsampler 215 or a first input of an adder 220 (e.g.—a summing junction or other means for combining inputs). The output of the upsampler 215 is also connected in signal communication with the first input of the adder 220.

A second output of the entropy decoder 205 is connected in signal communication with a first input of an intra predictor 235 and with a first input of a motion compensator 240.

An output of the adder 220 is connected in signal communication with a first input of a reference picture stores 245. The output of the adder 220 is also connected in signal communication with an input of a deblock filter 225 or with an input of an upsampler 230. An output of the deblock filter 225 is connected in signal communication with a second input of the reference picture stores 245. The output of the deblock filter 225 is also available as an output of the video decoder 200.

An output of the reference picture stores 245 is connected in signal communication with a second input of the motion compensator 240 and with a second input of the intra predictor 235. An output of the motion compensator 240 is connected in signal communication with a second input of the adder 220. The output of the intra predictor 235 is connected in signal communication with the second input of the adder 220.

Turning to FIG. 3, a table illustrating low resolution samples of neighboring macroblocks used for intra prediction of a current macroblock is indicated generally by the reference numeral 300. In particular, the table 300 illustrates low resolution samples r0-r15, c0-c15 of the neighboring macroblocks that are used for the intra prediction of the current macroblock.

Figure 4:
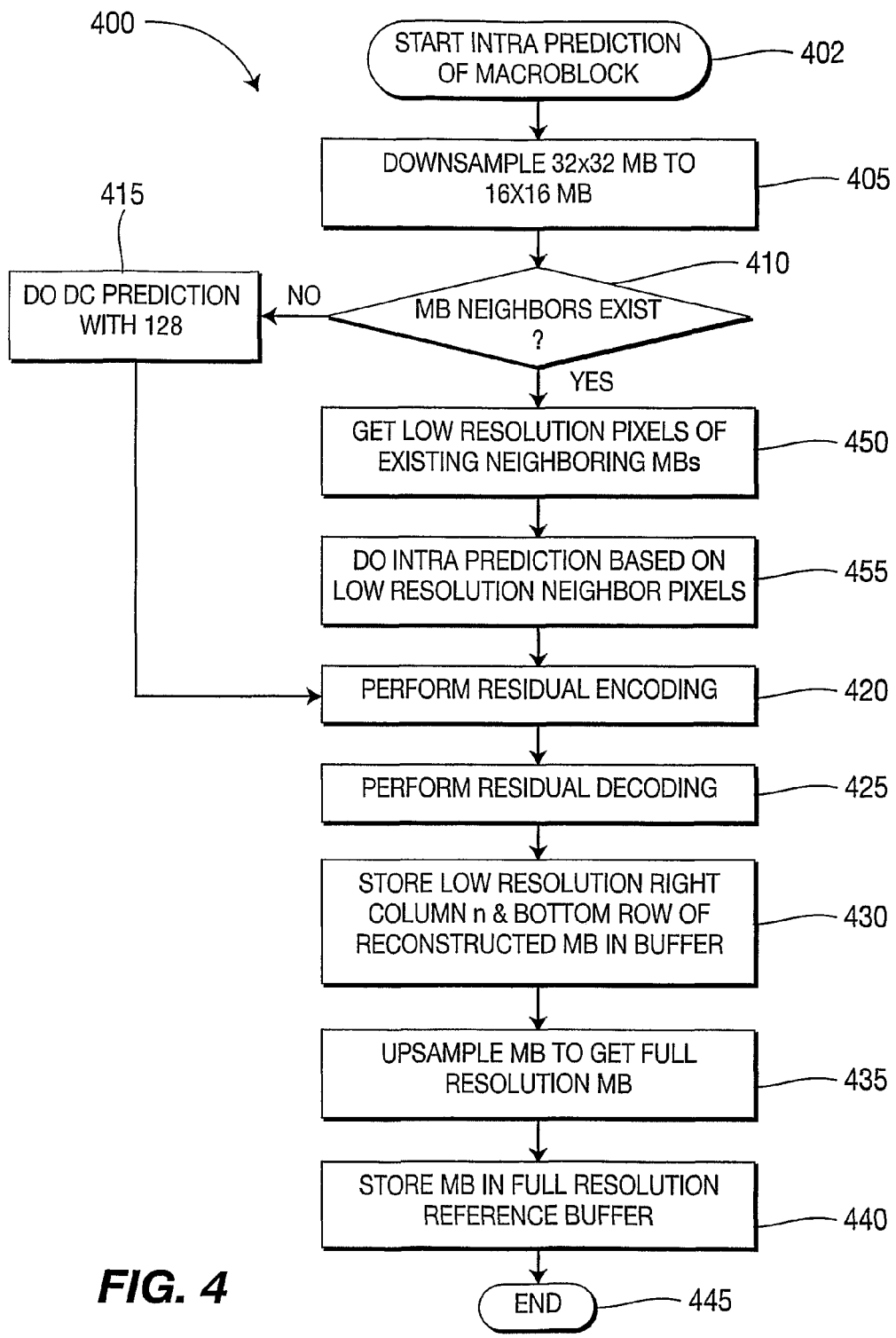
FIG. 4 shows a flow diagram for a method for INTRA prediction in accordance with the principles of the present invention.

The approach employed in FIG. 4, which is directed to INTRA prediction in accordance with the principles of the present invention, will now be described generally, followed by a more detailed description thereof with respect to the method steps illustrated in FIG. 4. The approach described with respect to FIG. 4 is applicable to an encoder or CODEC. To perform intra prediction on a macroblock, it is first checked whether its neighbors are available and are intra coded. If the neighbors can be used for intra prediction, the previously stored (column and row) low resolution pixels of its neighbors are used for the intra prediction process. The prediction methods remain the same for all modes for the 4×4 and 16×16 block sizes. For example, for 4×4 vertical prediction uses samples r0 to r3 from the previously stored low resolution pixels of the above macroblock as illustrated in FIG. 3.

Turning to FIG. 4, a method for INTRA prediction on a macroblock is indicated generally by the reference numeral 400. As noted above, the method of FIG. 4 is applicable to an encoder or CODEC.

A start block 402 passes control to a function block 405. The function block 405 downsamples a 32×32 MB macroblock to 16×16 MB, and passes control to a decision block 410. The decision block 410 determines whether or not any macroblock (MB) neighbors exist. If no macroblock neighbors exist, then control is passed to a function block 415. Otherwise, if macroblock neighbors exist, then control is passed to a function block 450.

The function block 415 does DC prediction with 128, and passes control to a function block 420. The function block 420 performs residual encoding, and passes control to a function block 425. The function block 425 performs residual decoding, adds the residue to the prediction samples to form the reconstructed MB and passes control to a function block 430. The function block 430 stores the low resolution right column and bottom row of the reconstructed MB in a buffer, and passes control to a function block 435. The function block 435 upsamples the macroblock to get a full resolution macroblock, and passes control to a function block 440. The function block 440 stores the macroblock in a full resolution reference buffer, and passes control to an end block 445.

The function block 450 gets the low resolution pixels of the existing neighboring macroblocks, and passes control to a function block 455. The function block 455 does intra prediction based on the low resolution neighbor pixels, and passes control to function block 420.

Figure 5:
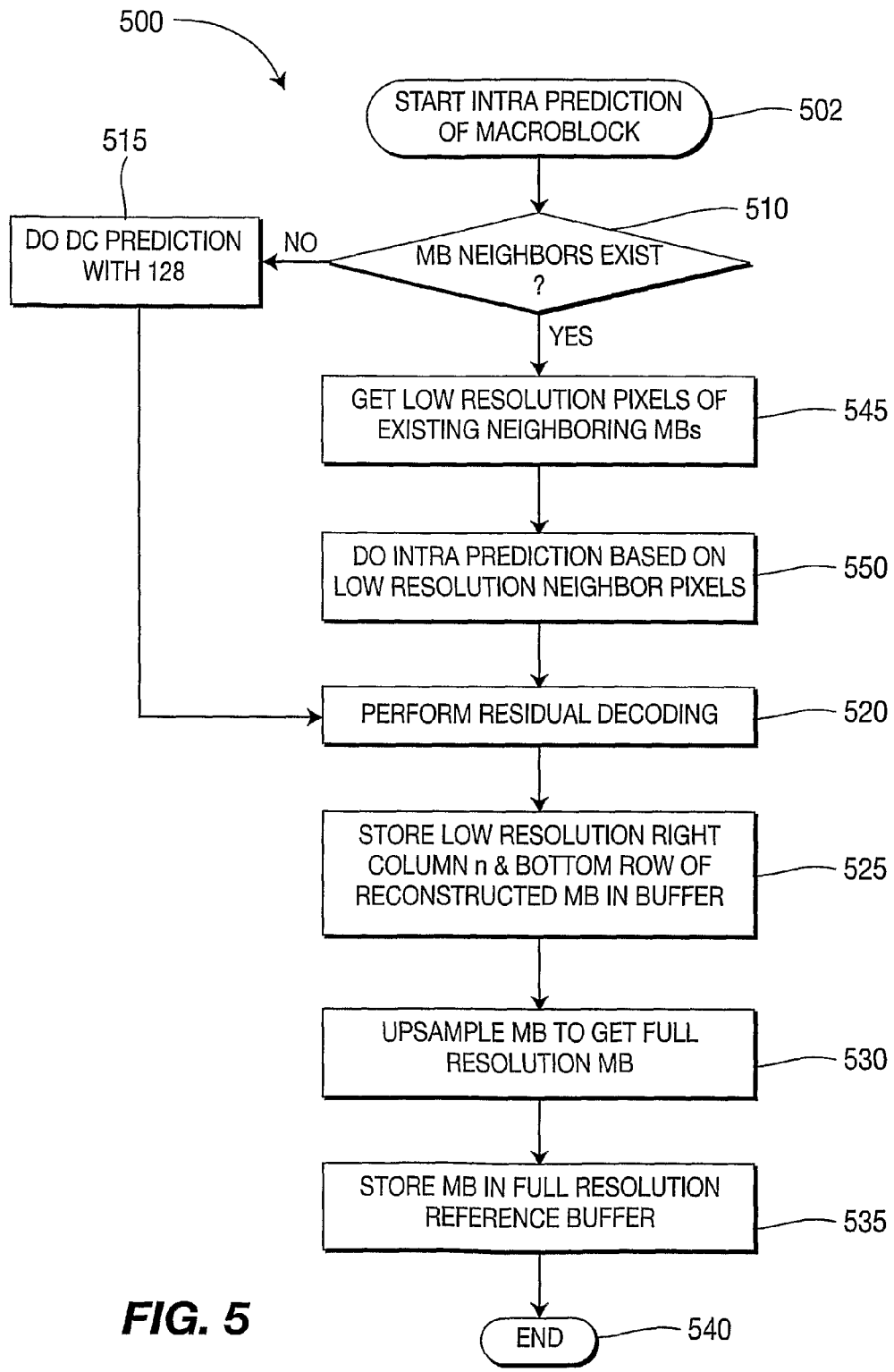
FIG. 5 shows a flow diagram for a method for INTRA prediction in accordance with the principles of the present invention.

A similar process to that of FIG. 4 is carried out at a decoder, as illustrated in FIG. 5. Accordingly, the approach employed in FIG. 5 will now be described generally, followed by a more detailed description thereof with respect to the method steps illustrated in FIG. 5. First the neighbors are checked to determine whether or not they exist. If the neighbors exist, then the previously stored low resolution pixels (column and row) are used to perform intra prediction for the current macroblock. For example, for 4×4 vertical prediction samples, r0 to r3 from the previously stored low resolution pixels of the above macroblock are used. After the prediction, residual decoding is performed and the right column and bottom row are stored for the reconstructed macroblock so that they can be used for its neighbors for intra prediction. The macroblock is then upsampled using the 6-tap filter as specified in H.264 for sub-pel interpolation.

Turning to FIG. 5, a method for INTRA prediction on a macroblock is indicated generally by the reference numeral 500. As noted above, the method of FIG. 5 is applicable to a decoder.

A start block 502 passes control to a decision block 510. The decision block 510 determines whether or not any macroblock (MB) neighbors exist. If no macroblock neighbors exist, then control is passed to a function block 515. Otherwise, if macroblock neighbors exist, then control is passed to a function block 545.

The function block 515 does DC prediction with 128, and passes control to a function block 520. The function block 520 performs residual decoding, adds the residue to the prediction samples to form the reconstructed MB and passes control to a function block 525. The function block 525 stores the low resolution right column and bottom row of the reconstructed MB in a buffer, and passes control to a function block 530. The function block 530 upsamples the macroblock to get a full resolution macroblock, and passes control to a function block 535. The function block 535 stores the macroblock in a full resolution reference buffer, and passes control to an end block 540.

The function block 545 gets the low resolution pixels of the existing neighboring macroblocks, and passes control to a function block 550. The function block 550 does intra prediction based on the low resolution neighbor pixels, and passes control to function block 520.

In one embodiment of the present invention, after the prediction at the encoder, residual coding is performed and added back to the prediction samples to form the reconstructed MB, and the right column and bottom row for a macroblock are stored so that they can be used for the neighbors of that macroblock for intra prediction. The macroblock is then upsampled using the 6-tap filter for sub-pel interpolation. In a previously suggested approach, the same upsampling filter is used for both inter and intra data, such as that shown in shown in FIGS. 6A and 6B. Turning to FIGS. 6A and 6B, residual upsampling processes for block boundaries and inner positions are indicated generally by the reference numerals 600 and 650, respectively. The upsampling filter employed with respect to FIGS. 6A and 6B has fewer taps than the 6-tap interpolation filter of H.264 and, hence, is more suited to residual data than to image data, as residual data tends to be less correlated than image data. In accordance with the principles of the present invention, the filter employed with respect to FIGS. 6A and 6B is still used for inter residual data, but is not used to upsample reconstructed low resolution intra macroblock data. Better visual quality is achieved using the 6-tap interpolation filter of H.264, since image data is being upsampled (as opposed to residual data).

In accordance with the principles of the present invention, the use of stored low resolution pixels instead of downsampling the previously upsampled version for intra prediction gives better subjective quality than other methods. However, in accordance with the principles of the present invention, since the upsampling does not extend the macroblock boundaries, a discontinuity is produced on a 32×32 boundary. Thus, the strength of the loop deblocking filter may be increased, for example, when the block strength (BS) is equal to 4. The strength of the loop deblocking filter may be increased by increasing the value of alpha and beta to smooth the discontinuity along the MB boundary. This improves low resolution subjective quality in a complexity scalable CODEC.

A description will now be given of some of the many attendant advantages/features of the present invention. For example, one advantage/feature is a reduced resolution update (RRU) based video encoder for encoding video data divisible into macroblocks, wherein the RRU based video encoder includes a memory device for storing reduced resolution neighboring pixels, a downsampler for downsampling a full resolution macroblock to obtain a reduced resolution macroblock, INTRA coding means for performing INTRA prediction for the reduced resolution macroblock using the stored reduced resolution neighboring pixels, an encoder for encoding residual data for the reduced resolution macroblock, a decoder for decoding the residual data for the reduced resolution macroblock to form a reconstructed low resolution INTRA coded macroblock, an upsampler for upsampling the reconstructed low resolution INTRA coded macroblock to form a full resolution INTRA coded macroblock, and wherein the memory device is further for storing a right column and a bottom row of the reconstructed low resolution INTRA coded macroblock. Moreover, another advantage/feature is the encoder as described above, wherein the stored right column and bottom row of the reconstructed low resolution INTRA coded macroblock are stored for subsequent INTRA prediction of neighboring macroblocks. Further, another advantage/feature is the encoder as described above, wherein the decoder is an RRU video CODEC having a constrained_intra_prediction_flag equal to one. Also, another advantage/feature is the encoder as described above, wherein the encoder further includes a loop deblocking filter, and wherein the loop deblocking filter uses values of alpha and beta greater than 0 to increase a loop filter strength when a corresponding boundary strength is equal to four. Additionally, another advantage/feature is the encoder as described above, wherein the upsampler includes an INTRA coding upsampling filter and an INTER coding upsampling filter, and more filter taps are used for the INTRA coding upsampling filter than for the INTER coding upsampling filter. Moreover, another advantage/feature is a reduced resolution update (RRU) based video decoder for decoding video data divisible into macroblocks, wherein the RRU based video decoder includes INTRA prediction means for performing INTRA prediction for a current macroblock using stored low resolution neighboring pixels, a decoder for decoding residual data for the current macroblock to reconstruct the current macroblock, a memory device for storing a right column and a bottom row of the reconstructed current macroblock, and an upsampler for upsampling the reconstructed current macroblock to form a full resolution current macroblock. Further, another advantage/feature is a reduced resolution update (RRU) based video CODEC, wherein the RRU based video CODEC includes at least two upsampling filters, wherein different ones of the at least two upsampling filters are used to upsample INTRA coded macroblocks than to upsample INTER coded macroblocks. Also, another advantage/feature is the RRU based video CODEC with the at least two upsampling filters as described above, wherein an H.264 6-tap sub-pel interpolation filter is used for INTRA coded macroblocks and an H.264 RRU upsampling filter is used for INTER coded macroblocks. Additionally, another advantage/feature is a scalable video CODEC, wherein the scalable video CODEC includes a reduced resolution update (RRU) based scalable CODEC for performing INTRA prediction using stored low resolution neighboring pixels.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus, comprising:
a reduced resolution update based video encoder for encoding video data divisible into macroblocks, the reduced resolution update based video encoder including a hardware memory device for storing reduced resolution neighboring pixels and a hardware downsampler for downsampling a full resolution macroblock to obtain a reduced resolution macroblock;
where the video encoder is further configured to perform intra prediction for the reduced resolution macroblock using the stored reduced resolution neighboring pixels,
where the video encoder is further configured to encode residual data for the reduced resolution macroblock and to decode the residual data for the reduced resolution macroblock to form a reconstructed low resolution intra-coded coded macroblock,
where the video encoder further includes a hardware upsampler for upsampling the reconstructed low resolution intra-coded macroblock to form a full resolution intra-coded macroblock, and
where the hardware memory device is further utilized for storing reconstructed low resolution intra-coded macroblocks for subsequent intra-prediction of neighboring macroblocks.

2. The apparatus according to claim 1, wherein the stored reconstructed low resolution intra-coded macroblocks for subsequent intra-prediction of neighboring macroblocks are stored in right columns and bottom rows.

3. The apparatus according to claim 1, wherein said the video encoder includes a reduced resolution update video decoder having a constrained_intra_prediction_flag equal to one.

4. The apparatus according to claim 1, further comprising a loop deblocking filter, and wherein said loop deblocking filter uses values of alpha and beta greater than zero to increase a loop filter strength when a corresponding boundary strength is equal to four.

5. The apparatus according to claim 1, wherein the upsampler comprises an intra-coding upsampling filter and an inter-coding upsampling filter, and more filter taps are used for the intra-coding upsampling filter than for the inter-coding upsampling filter.

6. An apparatus, comprising:
a reduced resolution update based video decoder for decoding video data divisible into macroblocks, the reduced resolution update based video decoder configured to perform intra-prediction for a current macroblock using stored low resolution neighboring pixels, and to decode residual data for the current macroblock to reconstruct the current macroblock;
where the video decoder further includes a hardware memory device for storing a right column and a bottom row of the reconstructed current macroblock and a hardware upsampler for upsampling the reconstructed current macroblock to form a full resolution current macroblock.

7. A method, comprising:
performing, by a video encoder, a reduced resolution update based method to encode video data from an image sequence divisible into macroblocks, said performing step further comprising the steps of:
downsampling a full resolution macroblock to obtain a reduced resolution macroblock;
performing intra-prediction for the reduced resolution macroblock using stored reduced resolution neighboring pixels;
encoding residual data for the reduced resolution macroblock;
decoding the residual data for the reduced resolution macroblock to form a reconstructed low resolution intra-coded macroblock;
storing a right column and a bottom row of the reconstructed low resolution intra-coded macroblock; and upsampling the reconstructed low resolution intra-coded macroblock to form a full resolution intra-coded macroblock.

8. The method according to claim 7, further comprising the step of utilizing the stored right column and bottom row of the reconstructed low resolution intra-coded macroblock for subsequent intra-prediction of neighboring macroblocks.

9. The method according to claim 7, wherein said decoding step uses a reduced resolution update video CODEC having a constrained_intra_prediction_flag equal to one.

10. The method according to claim 7, further comprising the step of increasing a loop filter strength using alpha and beta values greater than zero when a corresponding boundary strength is equal to four.

11. The method according to claim 7, wherein said upsampling step employs an INTRA coding upsampling filter and an inter-coding upsampling filter, and more filter taps are used for the intra-coding upsampling filter than for the inter-coding upsampling filter.

12. A method, comprising:
Performing, by a video decoder, a reduced resolution update based method for decoding video data received from a bit stream divisible into macroblocks, said performing step further comprising the steps of:
performing intra-prediction for a current macroblock using stored low resolution neighboring pixels;
decoding residual data for the current macroblock to reconstruct the current macroblock;
storing a right column and a bottom row of the reconstructed current macroblock; and
upsampling the reconstructed current macroblock to form a full resolution current macroblock.

\* \* \* \* \*